US 6,607,333 B2

(12) United States Patent
Satran et al.

(10) Patent No.: US 6,607,333 B2
(45) Date of Patent: Aug. 19, 2003

(54) MILLING CUTTER AND CUTTING INSERT THEREFOR

(75) Inventors: Amir Satran, Kfar Vradim (IL); Dina Agranovsky, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 10/091,418

(22) Filed: Mar. 7, 2002

(65) Prior Publication Data

US 2002/0094244 A1 Jul. 18, 2002

Related U.S. Application Data

(63) Continuation of application No. PCT/IL00/00557, filed on Sep. 12, 2000.

(30) Foreign Application Priority Data

Oct. 7, 1999 (IL) .................................................. 132261

(51) Int. Cl.⁷ .......................... B23B 27/00; B23B 29/00
(52) U.S. Cl. .......................................... 407/33; 407/42
(58) Field of Search ............................ 407/113, 114, 407/115, 116, 117, 118, 119, 33, 34, 35, 40, 42, 54, 62, 65

(56) References Cited

U.S. PATENT DOCUMENTS

| 4,709,737 | A | * | 12/1987 | Jonsson | 144/241 |
|---|---|---|---|---|---|
| 4,840,518 | A | * | 6/1989 | Plutschuck et al. | 407/113 |
| 5,704,737 | A | * | 1/1998 | Alford | 407/114 |
| 5,741,095 | A | * | 4/1998 | Charron et al. | 407/42 |
| 5,836,723 | A | * | 11/1998 | Von Haas et al. | 407/107 |
| 6,146,064 | A | * | 11/2000 | Flolo | 407/114 |
| 6,196,769 | B1 | | 3/2001 | Satran et al. | 407/40 |

FOREIGN PATENT DOCUMENTS

| DE | 299 08 039 U1 | 7/1999 |
|---|---|---|
| EP | 0216064 | 4/1987 |
| EP | 0 417 862 B1 | 3/1991 |
| WO | WO 00/50191 | 8/2000 |

OTHER PUBLICATIONS

International Search Report of PCT/IL00/00557 dated Jan. 24, 2001.
Written Opinion mailed Oct. 18, 2001 in PCT/IL00/00557.
Response to the Written Opinion mailed Oct. 18, 2001 in PCT/IL00/00557.
International Preliminary Examination Report in PCT IL00/00557 dated Dec. 20, 2001 with Examined Claims.

* cited by examiner

Primary Examiner—Henry W. H . Tsai
(74) Attorney, Agent, or Firm—Womble Carlyle

(57) ABSTRACT

A cutting tool assembly (20), for example ball nose end mill, having a single replaceable cutting insert (24, 100, 106) clamped between two clamping jaws (34, 32) having clamping surfaces (50, 42) with geometries complementary to those of the clamping surfaces (66, 64) of the cutting insert. In an end view of the cutting tool assembly, the clamping surfaces (50, 42) of the clamping jaws (34, 32) are at least partially convex and the insert clamping surfaces (66, 64) are concave. The cutting insert is secured in position by means of a clamping screw (26) that passes through through bores (44, 118) in the clamping jaws and in the cutting insert. When the cutting insert is clamped between the clamping jaws the side cutting edges of the cutting insert are provided with adequate support and are accurately radially located.

40 Claims, 11 Drawing Sheets

MILLING CUTTER AND CUTTING INSERT THEREFOR

RELATED APPLICATIONS

This is a Continuation of International Application PCT/IL00/00557, filed Sep. 12, 2000 and published as WO 01/24960.

FIELD OF THE INVENTION

This invention relates generally to milling cutters and more particularly to a ball nose end mill having a single replaceable cutting insert retained between clamping jaws, for use in high precision milling operations.

BACKGROUND OF THE INVENTION

Milling cutters are commonly used for profile and cavity milling in the auto, aircraft, die and mold industries. In order to achieve high accuracy and good surface quality in the work products produced by the milling cutters to which the present invention relates, the cutting insert should be retained in the milling cutter with a high degree of locational precision.

A problem with prior art milling cutters utilizing replaceable cutting inserts is that the latter are either flat plate-like or generally prismatic in shape and are clamped between two clamping jaws having clamping surfaces with geometries complementary to those of the surfaces of the cutting insert being clamped, i.e., flat or prismatic, respectively. The cutting insert is secured in position by means of a clamping screw that passes through through bores in the clamping jaws and in the cutting insert. Due to manufacturing tolerances it is difficult to ensure that the cutting insert is on a true centerline when retained in the milling cutter. Such manufacturing tolerances include, for example, the diameter of the clamping screw, the diameter of the through bores and the location of the through bores. That is, for cutting tools such as end mills having a single replaceable cutting insert retained between clamping jaws the radial location of two diametrically opposite cutting edges of the cutting insert can be ascertained only to within the total manufacturing tolerances. This being the case, the points on the cutting edges of the cutting insert will not necessarily lie precisely on a flight circle concentric with the axis of rotation of the milling cutter. For milling cutters having flat plate-like cutting inserts, manufacturing tolerances of the clamping screw and the through bore in the milling cutter and in the cutting insert are the main contributing factors to the radial location imprecision of the cutting insert. The radial location precision can be improved by using inserts that have generally prismatic abutting surfaces clamped in clamping jaws having complementary shaped clamping surfaces. However, even in this case radial location imprecision of the cutting insert will exist. The main contribution to the radial location imprecision coming from geometrical factors such as the tolerance of manufacture of the angle between adjacent surfaces comprising the prismatic abutting surfaces.

In EP 0 417 862 B1 a cutting tool assembly is described which ensures effective clamping of a cutting insert in an insert holder so that the cutting insert is effectively retained against displacement under cutting forces, and so that the relative position of the cutting insert with respect to the cutting insert holder is maintained substantially invariant, both during cutting operations and also when inserts have to be replaced. In the embodiment shown in FIG. 3 of '862, effective retention of the cutting insert is obtained between ribs of the clamping jaws of the cutting insert holder and the cutting insert along discrete axially directed locations which are symmetrically disposed with respect to, and spaced from, a longitudinally directed median plane. In the embodiment shown in FIG. 4 of '862, instead of effective retention along discrete axially directed locations, the retention is along narrow axially directed intermediate curved portions.

In both the embodiments described in '862 the ribs of the clamping jaws are formed with a clamping surface of substantially circular cross-sectional shape and the clamping contact between the clamping surfaces of the clamping jaws and the cutting insert is designed to take place along predetermined axial locations by forming the clamping surfaces of the cutting insert with side curved portions having a larger radius of curvature than that of the clamping surface of the clamping jaw and a central curved portion have a smaller radius of curvature than that of the clamping surface of the clamping jaw.

It should be noted that in both embodiments described in EP '862 the clamping surfaces of the cutting insert are of a non-uniform cross section and that in both embodiments the side portions of the clamping surfaces of the cutting inserts do not abut the clamping surfaces of the clamping jaws. A disadvantage of such a clamping arrangement is that it cannot be applied to cutting tool assemblies such as end mills comprising a single replaceable cutting insert retained between a pair of clamping jaws. The cutting inserts of such cutting tool assemblies have a width, measured between the side cutting edges, which is much greater than their thickness, measured between the clamping surfaces of the cutting insert, and the clamping arrangement described in EP '862 would not provide adequate support for the side cutting edges of the cutting insert.

It is therefore an object of the present invention to overcome the aforementioned disadvantage and to provide a milling cutter that will ensure accurate radial location of replaceable cutting inserts when clamped in the milling cutter whilst providing adequate support for the side cutting edges of the cutting insert.

It is a further object of the present invention to provide an indexable cutting insert for such a milling cutter.

SUMMARY OF THE INVENTION

In accordance with the present invention, there is provided a cutting tool assembly comprising a cutting insert holder, a cutting insert and a clamping screw, the cutting insert holder comprising a clamping portion connected to a body portion;

the clamping portion comprising:
- a lower clamping jaw having a lower peripheral surface and an upper clamping surface;
- an upper clamping jaw resiliently connected to the lower clamping jaw, the upper clamping jaw having a lower clamping surface and an upper peripheral surface;
- a through bore passing through the upper and lower clamping jaws, the through bore being threaded in one of the upper or lower clamping jaws;
- an insert receiving slot defined between the upper and lower clamping surfaces;

the cutting insert comprising:
- an insert upper clamping surface bounded by an upper edge;
- an insert lower clamping surface bounded by a lower edge;
- a peripheral side surface between the insert upper clamping surface and the insert lower clamping surface;

at least one cutting edge associated with the peripheral side surface;

at least one through hole passing through the cutting insert between the insert upper and lower clamping surfaces;

wherein:

in a front view of the cutting tool assembly, the upper and lower clamping surfaces of the lower and upper clamping jaws, respectively, are partially convex, and the insert lower and upper clamping surfaces are concave;

the cutting insert is retained in the insert receiving slot in a retained position by means of the clamping screw which passes through the through bore in the upper and lower clamping jaws of the cutting insert holder and through the at least one through hole in the cutting insert and is screwed into the threaded through bore in one of the upper or lower clamping jaws;

the lower clamping surface of the upper clamping jaw engages the insert upper clamping surface at at least one upper region of contact and the upper clamping surface of the lower clamping jaw engages the insert lower surface at at least one lower region of contact;

wherein:

the insert upper clamping surface conforms with a first cylindrical surface having a first radius of curvature, r1, and a first cylinder axis;

the insert lower clamping surface conforms with a second cylindrical surface having a second radius of curvature, r2, and a second cylinder axis;

the upper clamping surface of the lower clamping jaw partially conforms with a third cylindrical surface having a third radius of curvature, R2, and a third cylinder axis;

the lower clamping surface of the upper clamping jaw partially conforms with a fourth cylindrical surface having a fourth radius of curvature, R1, and a fourth cylinder axis;

the fourth radius of curvature, R1, is greater than the first radius of curvature, r1, the third radius of curvature, R2, is greater than the second radius of curvature, r2.

Preferably, the cutting insert holder has an axis of rotation (A) and the cutting insert has a longitudinal axis of rotational symmetry (B) and a center through which the longitudinal axis of rotational symmetry (B) passes, the longitudinal axis of rotational symmetry (B) constituting an axis of rotation of the cutting insert about which the cutting insert has 180° rotational symmetry.

In accordance with a specific application, the first radius of curvature and the second radius of curvature are equal in magnitude, r1=r2, defining a radius of curvature, r, of the cutting insert clamping surfaces, and the third radius of curvature and the fourth radius of curvature are equal in magnitude, R1=R2, defining a radius of curvature, R, of the clamping jaws' clamping surfaces.

In accordance with the present invention, the at least one upper region of contact comprises at least two outer regions of the insert upper clamping surface and the at least one lower region of contact comprises at least two outer regions of the insert lower clamping surface.

In accordance with one specific application, r=16 mm and R=16.2 mm.

In accordance with the present invention, the cutting insert has a width, W, which is greater than a thickness, T, where the width and thickness are measured in a front view of the cutting insert as, respectively, the distance between opposing portions of the peripheral side surface, and a maximum distance between the insert upper and lower clamping surfaces.

Generally, W/T lies in the range 2.5 to 4.0.

In accordance with a specific application, W/T is equal to 3.3.

Further in accordance with the present invention, the cutting insert has a width, W, which is greater than a thickness, t, where the width and thickness are measured in a front view of the cutting insert as, respectively, the distance between opposing portions of the peripheral side surface, and a minimum distance between the insert upper and lower clamping surfaces.

Generally, W/t lies in the range 4.0 to 6.0.

In accordance with a specific application, W/t is equal to 5.3.

Yet further in accordance with a specific application the radius of curvature, r, of the cutting insert clamping surfaces is approximately equal to W, and the radius of curvature, R, of the clamping jaw's clamping surfaces is approximately equal to W.

Generally, the insert receiving slot has a forward end for receiving a cutting insert and a rear end at which the upper clamping jaw is resiliently connected to the lower clamping jaw.

Preferably, the rear end of the insert receiving slot is provided with at least one insert axial location surface transverse to the axis of rotation (A) of the cutting insert holder.

Still further preferably, the rear end of the insert receiving slot is provided with at least one generally cylindrical groove transverse to the axis of rotation (A) of the cutting insert holder and adjacent the at least one insert axial location surface.

Still yet further preferably, the cutting insert has two end portions adjacent the axis of rotation (B) of the cutting insert, at least one of the two end portions being provided with axial abutment surfaces transverse to the axis of rotation (B) of the cutting insert.

Preferably, the axial abutment surfaces are ground.

In accordance with a first specific application, the at least one through hole in the cutting insert is implemented as a circular bore having a bore axis located substantially at the center of the cutting insert in a top view of the cutting insert, the bore axis being perpendicular to the axis of rotation (B) of the cutting insert.

In accordance with a second specific application, the at least one through hole in the cutting insert is implemented as two circular bores, each circular bore having a bore axis and a bore diameter (D1, D2), the bore diameter of each circular bore being substantially equal in magnitude (D1=D2=D), each bore axis being located at substantially the same distance (X1=X2=X) from the center of the cutting insert in a top view of the cutting insert, the bore axes being perpendicular to the axis of rotation (B) of the cutting insert and the distance (2x) between the two bore axes being greater than the bore diameter (D).

In accordance with a third specific application of the present invention, the at least one through hole is implemented by two intersecting circular bores, each circular bore having a bore axis and a bore diameter (D1, D2), the bore diameter of each circular bore being substantially equal in magnitude (D1=D2=D), each bore axis being located at substantially the same distance from the center of the cutting insert in a top view of the cutting insert, each bore axis being perpendicular to the axis of rotation (B) of the cutting insert and the distance (Y) between the two bore axes being less than the bore diameter (D).

In accordance with the second specific application of the present invention, the cutting insert is retained in the insert receiving slot in a retained position by means of a clamping screw which passes through the through bore in the upper and lower clamping jaws of the cutting insert holder and through the circular bore in the cutting insert closest the forward end of the insert receiving slot and is screwed into the threaded through bore in one of the upper or lower clamping jaws.

In accordance with the third specific application of the present invention, the cutting insert is retained in the insert receiving slot in a retained position by means of a clamping screw which passes through the through bore in the upper and lower clamping jaws of the cutting insert holder and through the circular bore in the cutting insert closest the forward end of the insert receiving slot and is screwed into the threaded through bore in one of the upper or lower clamping jaws.

In accordance with a specific application of the invention, the peripheral side surface of the cutting insert is provided with two diametrically opposite pairs of cutting edges so that when the cutting insert is retained in the insert receiving slot, one pair of cutting edges is located closer to the forward end of the insert receiving slot and constitutes a pair of operative cutting edges and the other pair of cutting edges is located closer to the rear end of the insert receiving slot and constitutes a pair of inoperative cutting edges.

Preferably, the peripheral side surface is provided with two diametrically opposite notches which are located on a first transverse axis of rotational symmetry (T1) and which separate between the diametrically opposite sets of cutting edges, the first transverse axis of rotational symmetry (T1) passing through the peripheral side surface and perpendicular to the longitudinal axis of rotational symmetry (B), the cutting insert having 180° rotational symmetry about the first transverse axis of rotational symmetry (T1).

Typically, each pair of cutting edges comprises one cutting edge which extends from a region close to where the longitudinal axis of rotational symmetry (B) passes through the peripheral side surface upwards towards a notch whilst the other cutting edge extends from the same region close to where the longitudinal axis of rotational symmetry passes through the peripheral side surface downwards towards the diametrically opposite notch.

Generally, each cutting edge is provided with a relief surface and a rake surface.

There is further provided in accordance with the present invention, a cutting insert having a longitudinal axis of rotation (B) and a center through which the longitudinal axis (B) passes, the longitudinal axis (B) constituting an axis of rotation of the cutting insert, the cutting insert comprising:

an insert upper clamping surface bounded by an upper edge;

an insert lower clamping surface bounded by a lower edge;

a peripheral side surface between the insert upper clamping surface and the insert lower clamping surface;

at least one cutting edge associated with the peripheral side surface;

at least one through hole passing through the cutting insert between the insert upper and lower clamping surfaces; wherein:

the insert upper clamping surface conforms with a portion of a first cylindrical surface having a first radius of curvature, r1, and a first cylinder axis;

the insert lower clamping surface conforms with a portion of a second cylindrical surface having a second radius of curvature, r2, and a second cylinder axis.

In accordance with a specific application, the first radius of curvature and the second radius of curvature are equal in magnitude, r1=r2, defining a radius of curvature, r, of the cutting insert clamping surfaces.

Further in accordance with a specific application, longitudinal axis (B) constitutes an axis of rotational symmetry of the cutting insert about which the cutting insert has 180° rotational symmetry.

In accordance with the present invention, the cutting insert has a width, W, which is greater than a thickness, T, where the width and thickness are measured in a front view of the cutting insert as, respectively, the distance between opposing portions of the peripheral side surface, and a maximum distance between the insert upper and lower clamping surfaces.

Generally, W/T lies in the range 2.5 to 4.0.

In accordance with a specific application W/T is equal to 3.3.

Further in accordance with the present invention, the cutting insert has a width, W, which is greater than a thickness, t, where the width and thickness are measured in an end view of the cutting insert as, respectively, the distance between opposing portions of the peripheral side surface, and a minimum distance between the insert upper and lower clamping surfaces.

Generally, W/t lies in the range 4.0 to 6.0.

In accordance with a specific application, W/t is equal to 5.3.

Still yet further preferably, the cutting insert has two end portions adjacent the axis of rotation (B) of the cutting insert, at least one of the two end portions being provided with axial abutment surfaces transverse to the axis of rotation (B) of the cutting insert.

Preferably, the axial abutment surfaces are ground.

In accordance with a first specific application, the at least one through hole in the cutting insert is implemented as a circular bore having a bore axis located substantially at the center of the cutting insert in a top view of the cutting insert, the bore axis being perpendicular to the axis of rotation (B) of the cutting insert.

In accordance with a second specific application, the at least one through hole in the cutting insert is implemented as two circular bores, each circular bore having a bore axis and a bore diameter (D1, D2), the bore diameter of each circular bore being substantially equal in magnitude (D1=D2=D), each bore axis being located at substantially the same distance (X1=X2=X) from the center of the cutting insert in a top view of the cutting insert, the bore axes being perpendicular to the axis of rotation (B) of the cutting insert and the distance (2x) between the two bore axes being greater than the bore diameter (D).

In accordance with a third specific application of the present invention, the at least one through hole is implemented by two intersecting circular bores, each circular bore having a bore axis and a bore diameter (D1, D2), the bore diameter of each circular bore being substantially equal in magnitude (D1=D2=D), each bore axis being located at substantially the same distance from the center of the cutting insert in a top view of the cutting insert, the bore axes being perpendicular to the axis of rotation (B) of the cutting insert and the distance (Y) between the two bore axes being less than the bore diameter (D).

There is yet further provided in accordance with the present invention, a cutting insert holder having an axis of rotation (A) and comprising a clamping portion connected to a body portion;

the clamping portion comprising:

a lower clamping jaw having a lower peripheral surface and an upper clamping surface;

an upper clamping jaw resiliently connected to the lower clamping jaw, the upper clamping jaw having a lower clamping surface and an upper peripheral surface;

a through bore passing through the upper and lower clamping jaws, the through bore being threaded in one of the upper or lower clamping jaws; and an insert receiving slot defined between the upper and lower clamping surfaces;

wherein:

the upper clamping surface of the lower clamping jaw partially conforms with a portion of a third cylindrical surface having a third radius of curvature, R2, and a third cylinder axis;

the lower clamping surface of the upper clamping jaw partially conforms with a portion of a fourth cylindrical surface having a fourth radius of curvature, R1, and a fourth cylinder axis; and in a front view of the cutting insert holder, the upper and lower clamping surfaces of the lower and upper clamping jaws, respectively, are partially convex.

In accordance with a specific application, the third radius of curvature and the fourth radius of curvature are equal in magnitude, R1=R2, defining a radius of curvature, R, of the clamping jaws' clamping surfaces.

Generally, the insert receiving slot has a forward end for receiving a cutting insert and a rear end at which the upper clamping jaw is resiliently connected to the lower clamping jaw.

Preferably, the rear end of the insert receiving slot is provided with at least one insert axial location surface transverse to the axis of rotation (A) of the cutting insert holder.

Still further preferably, the rear end of the insert receiving slot is provided with at least one generally cylindrical groove transverse to the axis of rotation (A) of the cutting insert holder and adjacent the at least one insert axial location surface.

In accordance with one embodiment, the lower clamping surface of the upper clamping jaw is divided into three regions, two substantially identical outer regions having a first radius of curvature and a central region having a second radius of curvature and the upper clamping surface of the lower clamping jaw is divided into three regions, two substantially identical outer regions having a first radius of curvature and a central region having a second radius of curvature.

Preferably, the second radius of curvature is larger than the first radius of curvature.

There is still yet further provided in accordance with the present invention, a clamping screw having a screw axis (C) and comprising:

an upper portion;

a central portion; and a lower portion;

the upper portion comprises an upper cylindrical portion and an upper frusto-conical portion, the upper frusto-conical portion tapers downwardly and inwardly from the upper cylindrical portion towards the central portion, the clamping screw upper portion is provided with a socket, for receiving a wrench for tightening or loosening the clamping screw, the clamping screw central portion has a central cylindrical portion connected at its upper end to the upper frusto-conical portion and at its lower end to a central frusto-conical portion, the central frusto-conical portion tapers downwardly and inwardly from the upper end thereof, to the lower end thereof, at the lower end thereof the central frusto-conical portion is connected, via a narrow neck portion, to the clamping screw lower portion, the clamping screw lower portion comprises a threaded portion of the clamping screw, the central frusto-conical portion tapers at an angle θ to the screw axis (C).

BRIEF DESCRIPTION OF THE DRAWINGS

For a better understanding the invention will now be described, by way of example only, with reference to the accompanying drawings in which.

DETAILED DESCRIPTION OF THE INVENTION

Figure 1:
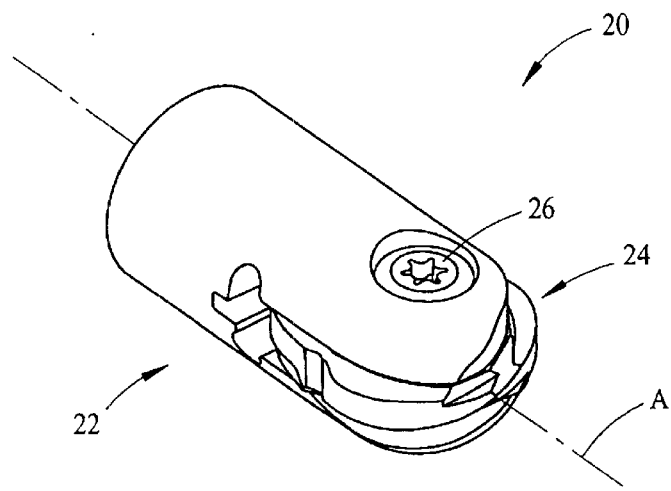
FIG. 1 is a perspective view of a cutting tool assembly according to the present invention.
Figure 2:
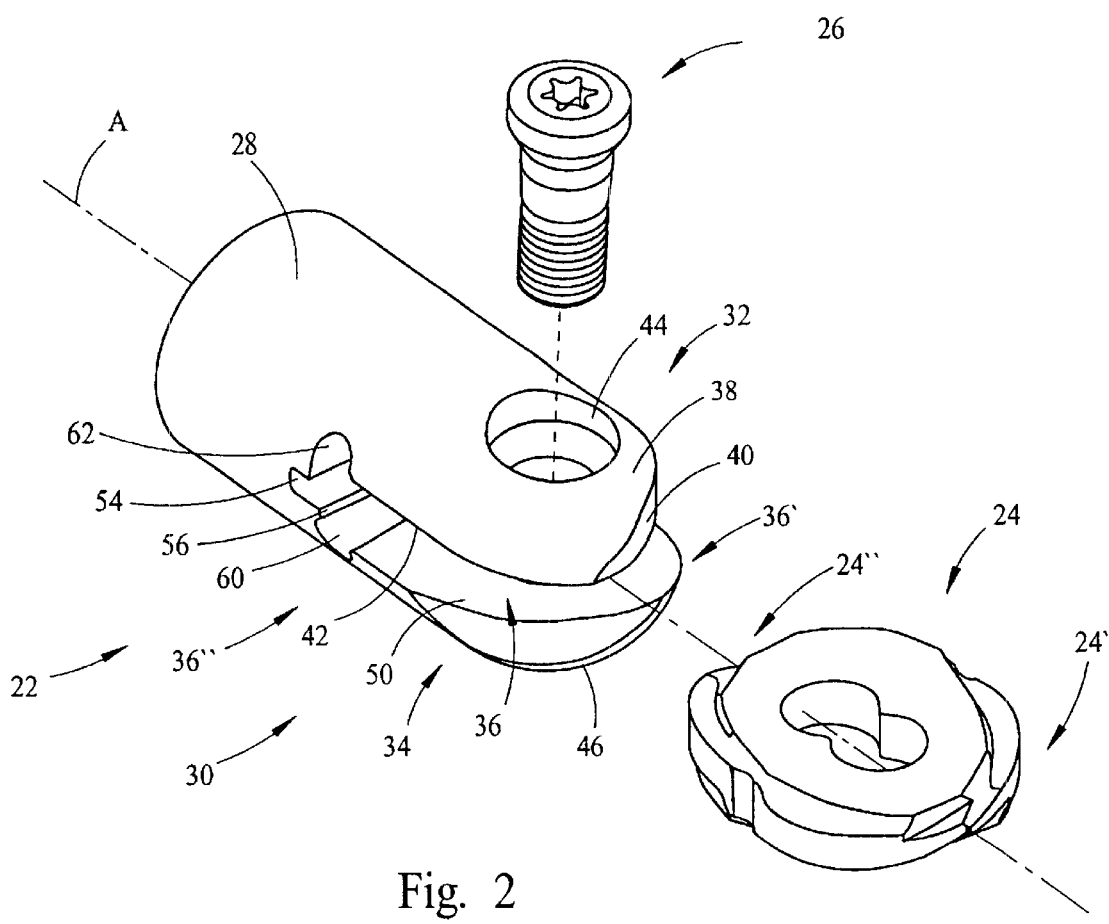
FIG. 2 is an exploded view of the cutting tool assembly of FIG. 1.

Attention is first drawn to FIGS. 1, 2, 3a, 3b and 5a. As shown, a cutting tool assembly 20 comprises a cutting insert holder 22 having an axis of rotation A, a cutting insert 24 and a clamping screw 26 for securing the cutting insert in the cutting insert holder. The cutting insert holder 22 comprises an elongated cylindrical body portion 28 and a clamping portion 30 in a front portion thereof. The clamping portion 30 consists of an upper clamping jaw 32 separated from a lower clamping jaw 34 by an insert receiving slot 36. The upper clamping jaw 32 has an upper peripheral surface 38 having a chip evacuation recess 40 in a front portion thereof, a lower clamping surface 42 and a through bore 44 transverse to the axis of rotation A. The lower clamping jaw 34 has a lower peripheral surface 46 having a chip evacuation recess 48 in a front portion thereof, an upper clamping surface 50 and a threaded bore 52 transverse to the axis of rotation A and aligned with the through bore 44 in the upper clamping jaw. The terms "upper", "lower", "forward" and "rear" are used herein with reference to the orientation of the cutting insert holder 22 and the cutting insert 24 as shown in FIGS. 1 and 2. Hence, the cutting insert 24 has a forward end 24' and a rear end 24". Similarly, the insert receiving slot 36 has a forward end 36' and a rear end 36".

The upper clamping jaw is resiliently connected to the lower clamping jaw at the rear end of the insert receiving slot via a slot 54 transverse to the axis of rotation A. Adjacent the slot 54 are two insert axial location surfaces transverse to the axis of rotation A, a lower insert axial location surface 56 and an upper insert axial location surface 58. A lower generally cylindrical groove 60, transverse to the axis of rotation A, is located between the lower insert axial location surface 56 and the upper clamping surface 50 of the lower clamping jaw 34. An upper generally cylindrical groove 62, transverse to the axis of rotation A, is located between the upper insert axial location surface 58 and the lower clamping surface 42 of the upper clamping jaw 32.

Figure 3A:
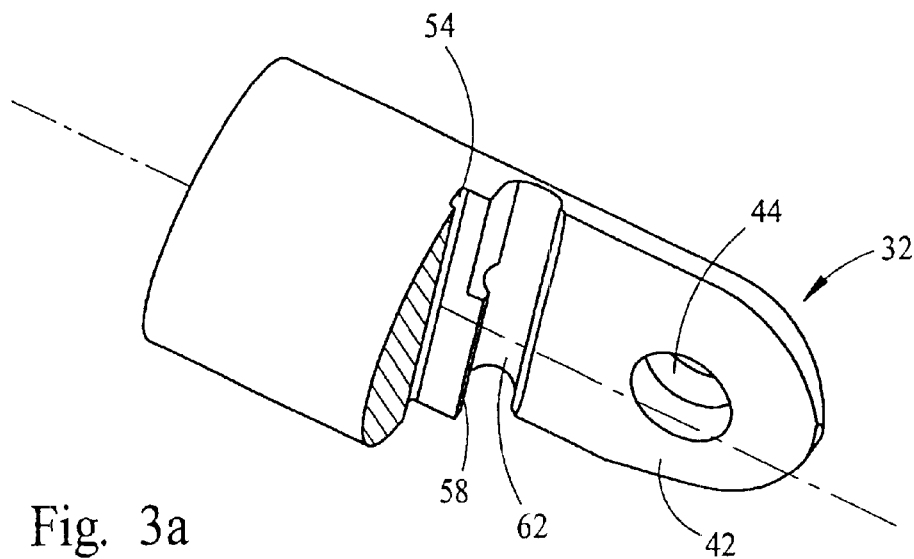
FIG. 3a is a bottom perspective view of the cutting insert holder shown in FIG. 2 with the lower clamping jaw removed for the purpose of clarification.
Figure 3B:
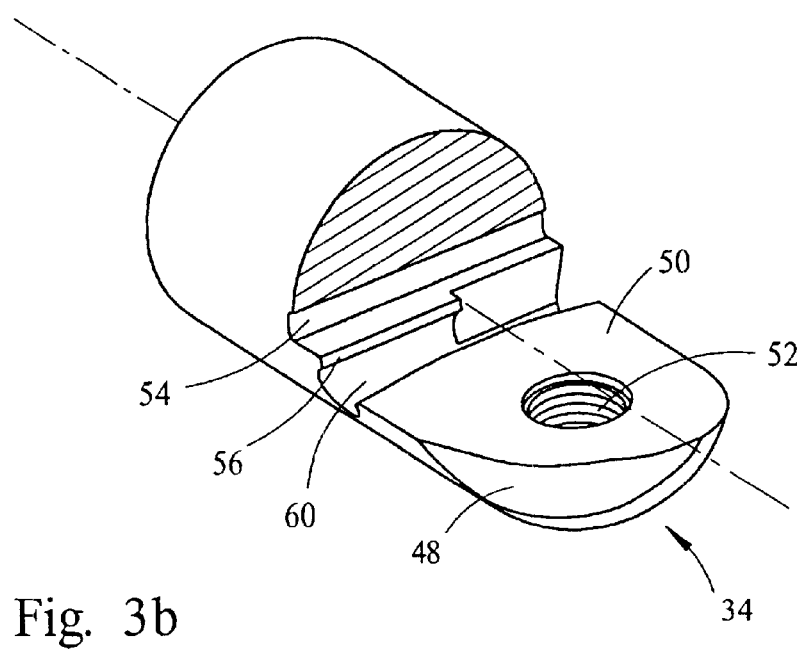
FIG. 3b is a top perspective view of the cutting insert holder shown in FIG. 2 with the upper clamping jaw removed for the purpose of clarification.
Figure 5A:
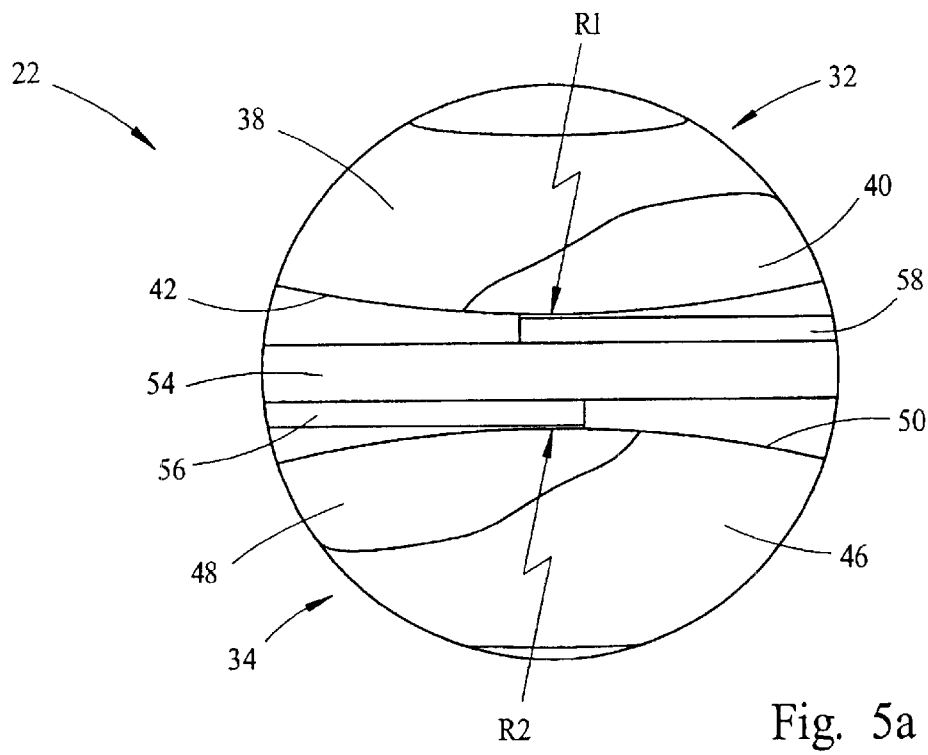
FIG. 5a is a front view of the cutting insert holder according to the present invention.

In accordance with a first embodiment of the cutting insert holder 22, the lower clamping surface 42 of the upper clamping jaw 32 conforms with a portion of a cylindrical surface having a radius of curvature R1 and a cylinder axis generally parallel to the axis of rotation A, so that in an end view of the cutting insert holder 22 the lower clamping surface of the upper clamping jaw is convex (see FIGS. 3a and 5a). The upper clamping surface 50 of the lower clamping jaw 34 conforms with a portion of a cylindrical surface having a radius of curvature R2 and a cylinder axis generally parallel to the axis of rotation A, so that in an end view of the cutting insert holder 22 the upper clamping surface of the lower clamping jaw is convex (see FIGS. 3b and 5a). Generally, the radii of curvature R1, R2 of the lower and upper clamping surfaces 42, 50 do not have to be identical.

Figure 4A:
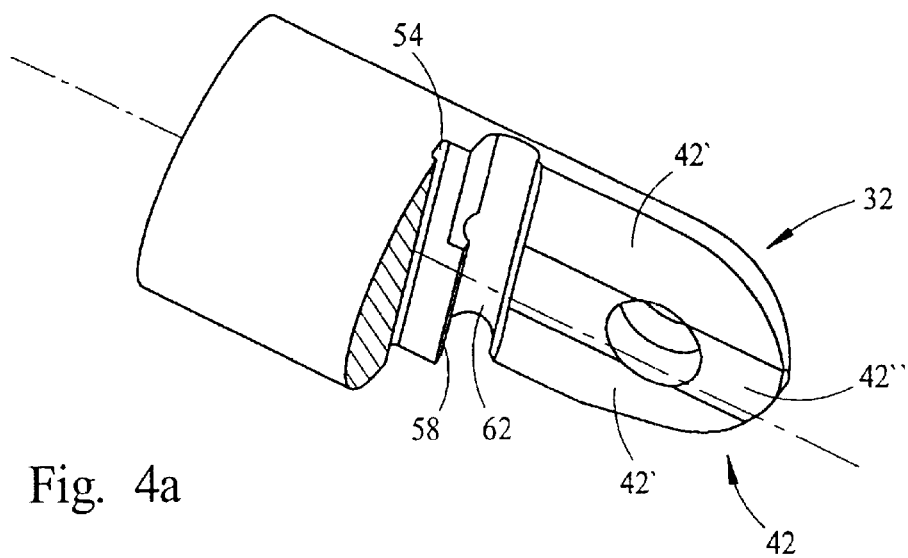
FIG. 4a is similar to FIG. 3a but for a cutting insert holder with the lower clamping surface of the upper clamping jaw divided into three regions.
Figure 4B:
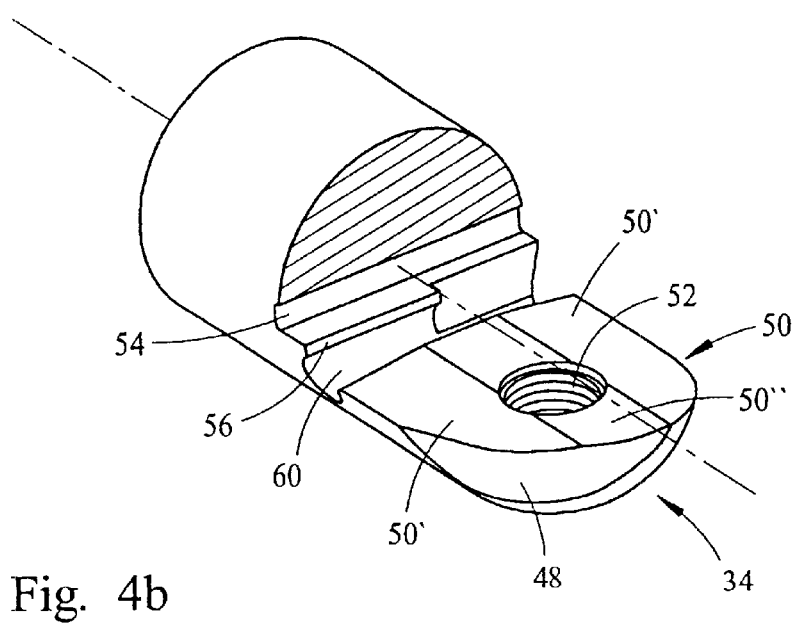
FIG. 4b is similar to FIG. 3b but for a cutting insert holder with the upper clamping surface of the lower clamping jaw divided into three regions.
Figure 5B:
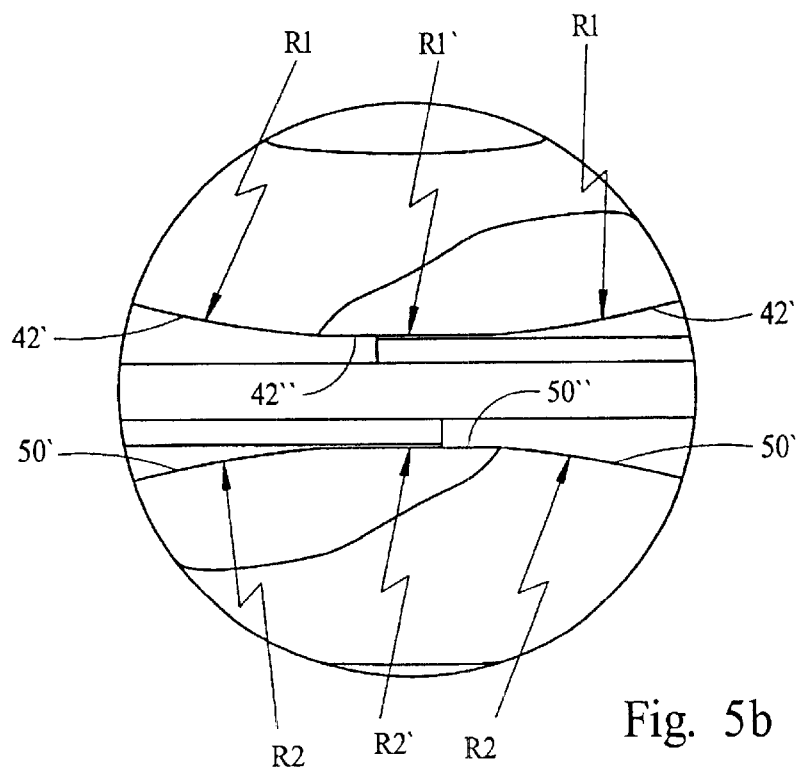
FIG. 5b is similar to FIG. 5a but for a cutting insert holder with the clamping surfaces of the clamping jaws divided into three regions.

FIGS. 4a, 4b and 5b show a second embodiment of the cutting insert holder 22. In accordance with this embodiment, which is a preferred embodiment of the present invention, the lower clamping surface 42 of the upper clamping jaw 32 is divided into three regions, two substantially identical outer regions 42' on either side of a central region 42". The term "substantially identical" in this context is used to indicate that the two outer regions 42' are identical to within manufacturing tolerances. Each of the two outer regions conforms with a portion of a common cylindrical surface having a radius of curvature R1 and a cylinder axis generally parallel to the axis of rotation A, whereas the central region 42" is either planar, or conforms with a portion of a cylindrical surface having a radius of curvature R1' larger than the radius of curvature R1 of the outer regions 42'. Therefore, in accordance with this embodiment, the lower clamping surface 42 of the upper clamping jaw 32 at least partially conforms with a portion of a cylindrical surface. Similarly, the upper clamping surface 50 of the lower clamping jaw 34 can be formed to at least partially conform with a portion of a cylindrical surface by dividing it into three regions, two substantially identical outer regions 50' on either side of a central region 50". Each of the two outer regions 50' conforms with a portion of a common cylindrical surface having a radius of curvature R2 and a cylinder axis generally parallel to the axis of rotation A, whereas the central region 50" is either planar, or conforms with a portion of a cylindrical surface having a radius of curvature R2' larger than the radius of curvature R2 of the outer regions 50'.

Figure 6:
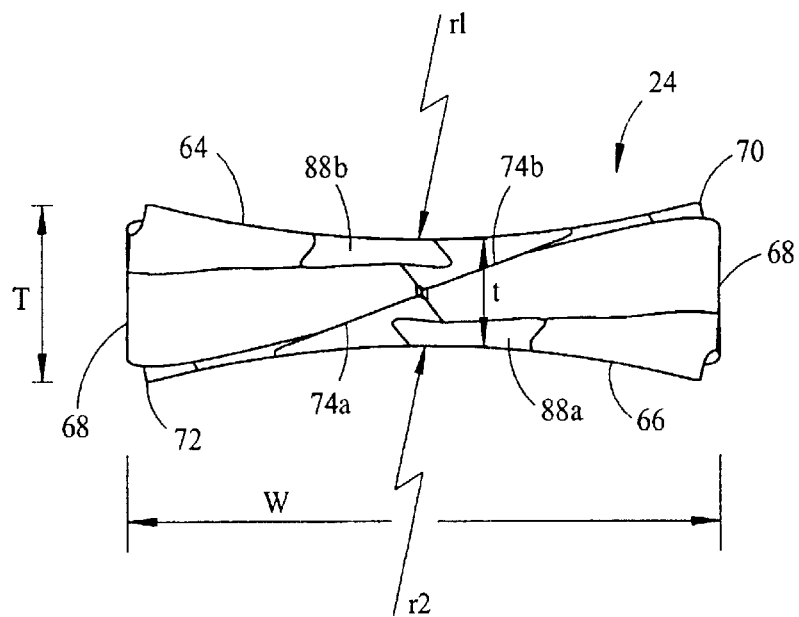
FIG. 6 is a front view of the cutting insert according to the present invention.
Figure 7:
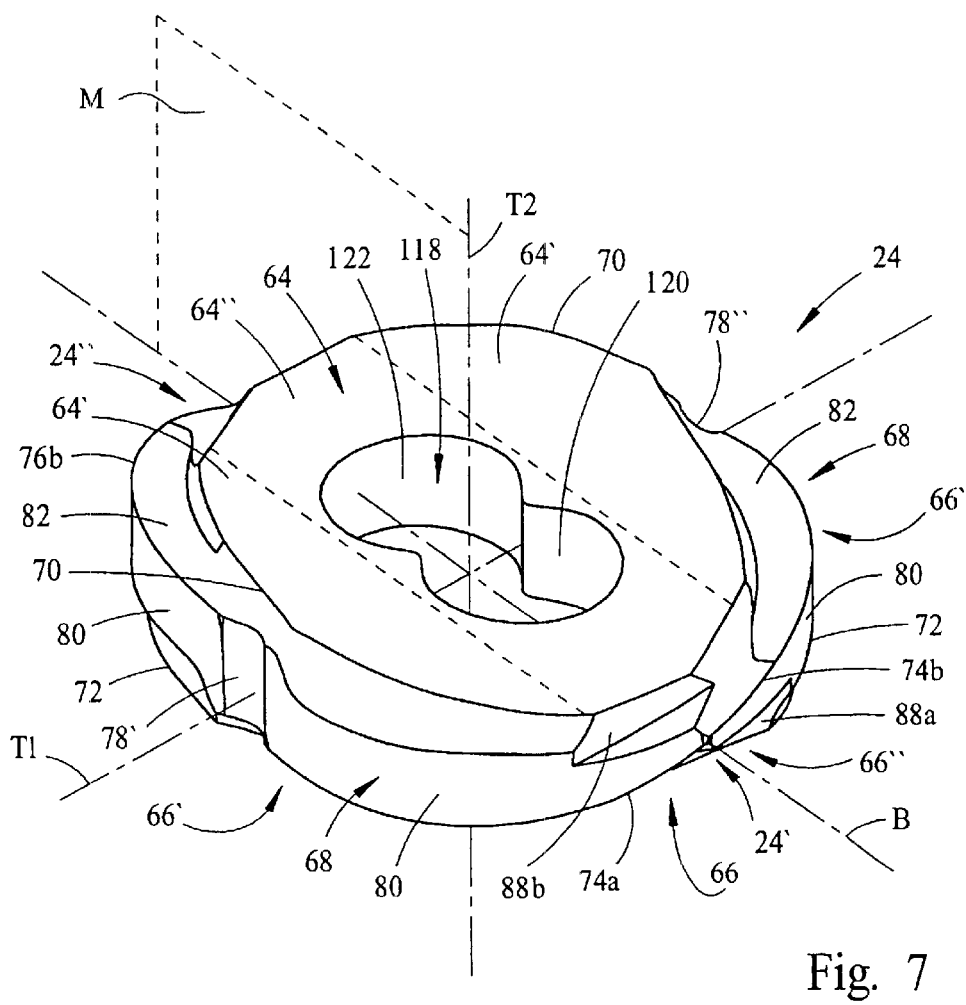
FIG. 7 is an enlarged view of the cutting insert shown in FIG. 2.
Figure 8:
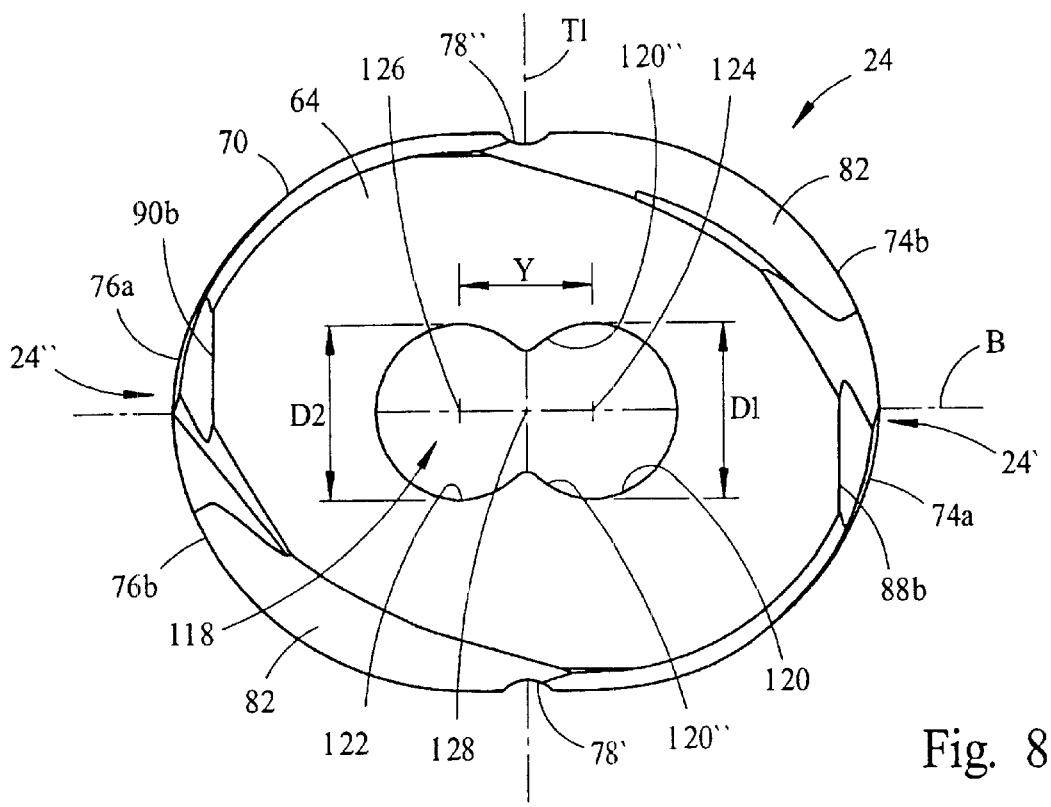
FIG. 8 is a top view of the cutting insert shown in FIG. 7.

Attention is now drawn to FIGS. 6 to 8. The cutting insert 24 comprises an insert upper clamping surface 64, an insert lower clamping surface 66 and a peripheral side surface 68 between the insert upper clamping surface and the insert lower clamping surface. The insert upper clamping surface 64 intersects the peripheral side surface 68 at an upper edge 70 and the insert lower clamping surface 66 intersects the peripheral side surface 68 at a lower edge 72. The upper edge 70 constitutes a peripheral boundary of the insert upper clamping surface 64, similarly the lower edge 72 constitutes a peripheral boundary of the insert lower clamping surface 66. The cutting insert 24 has a longitudinal axis of rotation B. In accordance with a preferred embodiment, the axis of rotation B, constitutes an axis of rotational symmetry of the cutting insert, about which the cutting insert has 180° rotational symmetry and the lower edge 72 is equivalent in form to the upper edge 70, due to the 180° rotational symmetry of the cutting insert about the axis of rotational symmetry B.

The cutting insert 24 is indexable and therefore the peripheral side surface 68 of the cutting insert is provided with two diametrically opposite pairs of cutting edges, a front pair of cutting edges 74a, 74b and a rear pair of cutting edges 76a, 76b. When the cutting insert 24 is retained in the insert receiving slot 36, the front pair of cutting edges 74a, 74b is located closer to the front end of the insert receiving pocket and constitute a pair of operative cutting edges and the rear pair of cutting edges 76a, 76b is located closer to the rear end of the insert receiving pocket and constitute a pair of inoperative cutting edges.

The cutting insert has a first transverse axis T1 passing through the peripheral side surface 68 and perpendicular to the longitudinal axis of rotation B. The cutting insert has a second transverse axis T2 perpendicular to the longitudinal axis of rotation B and to the first transverse axis T1, the cutting insert having 180° rotational symmetry about the second transverse axis of rotational symmetry T2.

The peripheral side surface is provided with two diametrically opposite notches 78', 78" which are located on the first transverse axis T1 and which separate between the diametrically opposite pairs of cutting edges, that is, between the front pair 74a, 74b and the rear pair of cutting edges 76a, 76b.

For the front pair of cutting edges, cutting edge 74a extends from a region close to where the longitudinal axis of rotational symmetry B passes through the peripheral side surface 68 downwards and rearwards towards the notch 78' whilst the other cutting edge 74b extends from the same region close to where the longitudinal axis of rotational symmetry B passes through the peripheral side surface 68 upwards and rearwards towards the diametrically opposite notch 78". Due to the symmetrical nature of the cutting insert, the rear pair of cutting edges are identical to the front pair of cutting edges. Each cutting edge is provided with a relief surface 80 and a rake surface 82.

The insert upper clamping surface 64 conforms with a portion of a cylindrical surface having a radius of curvature r1 and a cylinder axis generally parallel to the longitudinal axis of rotational symmetry B. Similarly, the insert lower clamping surface 66 conforms with a portion of a cylindrical surface having a radius of curvature r2 and a cylinder axis generally parallel to the longitudinal axis of rotational symmetry B. Hence, in an end view of the cutting insert 24 the insert's upper and lower clamping surfaces are concave (see FIG. 6). Generally, the radii of curvature r1, r2 of the insert upper and lower clamping surfaces do not have to be identical.

In accordance with a preferred embodiment of the present invention, the radii of curvature r1, r2 of the insert upper and lower clamping surfaces are substantially equal in magnitude, r1=r2=r, defining a single value r for the radius of curvature for each of the cutting insert clamping surfaces. The cylinder axis of the lower clamping surface is parallel to the cylinder axis of the upper clamping surface and both the cylinder axes lie in a vertical longitudinal median plane of the cutting insert which includes the axes T2 and B. In accordance with this preferred embodiment, the longitudinal axis of rotation B and the first transverse axis T1 are axes of rotational symmetry. The cutting insert 24 having 180° rotational symmetry about each of these axes. In this embodiment the lower clamping surface 66 is identical in form to the upper clamping surface 64 and the lower edge 72 is identical in form to the upper edge 70.

In FIG. 6, three dimensions, W, T and t defining the basic linear dimensions of the cutting insert in an end view are shown. The width, W, of the cutting insert is defined as the distance between opposing portions of the peripheral side surface. The maximum thickness, T, of the cutting insert is defined as the maximum distance between the insert upper and lower clamping surfaces as measured in an end view. The minimum thickness, t, of the cutting insert is defined as the minimum distance between the insert upper and lower clamping surfaces as measured in an end view.

Generally, W/T lies in the range 2.5 to 4.0 and W/t lies in the range 4.0 to 6.0. In accordance with a specific application, W/T is equal to 3.3 and W/t is equal to 5.3.

In accordance with a preferred embodiment of the present invention, the radii of curvature R1, R2 of the lower and upper clamping surfaces of the clamping jaws are substantially equal in magnitude, R1=R2=R, defining a single value for the radius of curvature R for each of the clamping surfaces of the clamping jaws. The cylinder axes of the lower and upper clamping surfaces of the clamping jaws are parallel and lie in the vertical median plane of the cutting insert, when the cutting insert is retained in the cutting insert holder.

In accordance with the present invention the radius of curvature of the clamping jaw's clamping surfaces R is greater than the radius of curvature r of the cutting insert clamping surfaces. That is, for the general case, the value of R1 is greater than the value of r1 and the value of R2 is greater than the value of r2. In accordance with a preferred embodiment R1=R2=R and r1=r2=r and the value of R is greater than the value of r. Symbolically, this can be expressed as R=r+δ, where δ, is a positive number.

In accordance with one specific application, r=16 mm and R=16.2 mm.

The cutting insert 24 is provided with two axial abutment surfaces 88a, 88b at its front end 24' and two axial abutment surfaces 90a, 90b at it rear end 24". The axial abutment surfaces are transverse to the axis of rotation B of the cutting insert. When the cutting insert 24 is retained in the insert retaining slot 36, as shown in FIG. 1, the upper rear abutment surface 90b abuts the upper insert axial location surface 58, and the lower rear abutment surface 90a (not seen in the figures) abuts the lower insert axial location surface 56, thereby fixing the axial location of the cutting insert in the cutting insert holder. The axial abutment surfaces 88a, 88b; 90a, 90b are preferably ground in order to increase the accuracy of the axial location of the cutting insert in the cutting insert holder.

Attention is now drawn to FIGS. 7 to 10. In order to securely clamp the cutting insert in the cutting insert holder the cutting insert is provided with at least one through hole passing through the cutting insert between the insert upper and lower clamping surfaces. In general, a cutting insert for clamping in the insert holder shown in FIG. 1 will have either one or two through holes, depending on the length of the cutting insert. The reason for this being that the through bore 44 in the upper clamping jaw 32 and the associated threaded bore 52 in the lower clamping jaw 34 are preferably located as close as possible to the front end of the cutting insert holder in order to ensure that the front end portions of the clamping jaws close tightly on the retained cutting insert.

Figure 9:
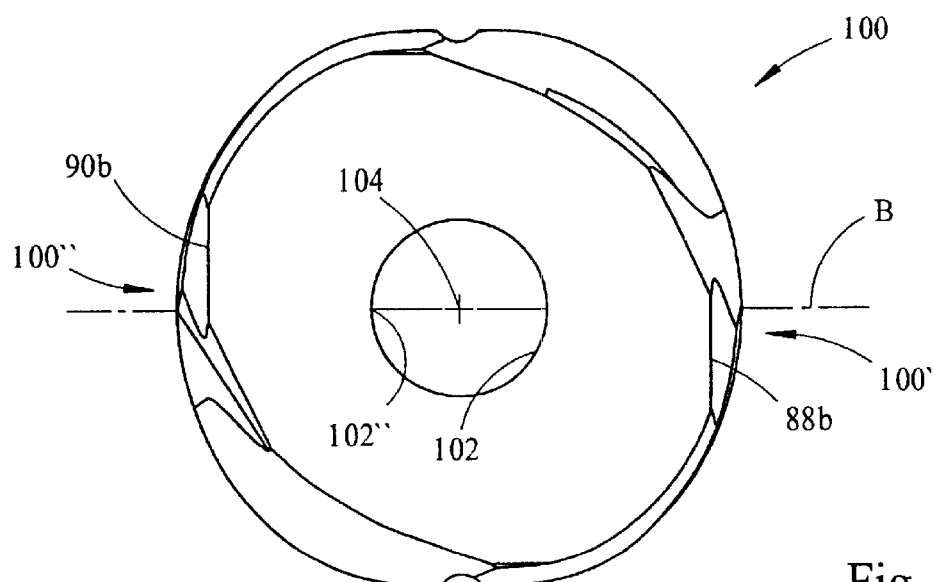
FIG. 9 is a top view of a cutting insert in accordance with the present invention with one circular through bore.
Figure 10:
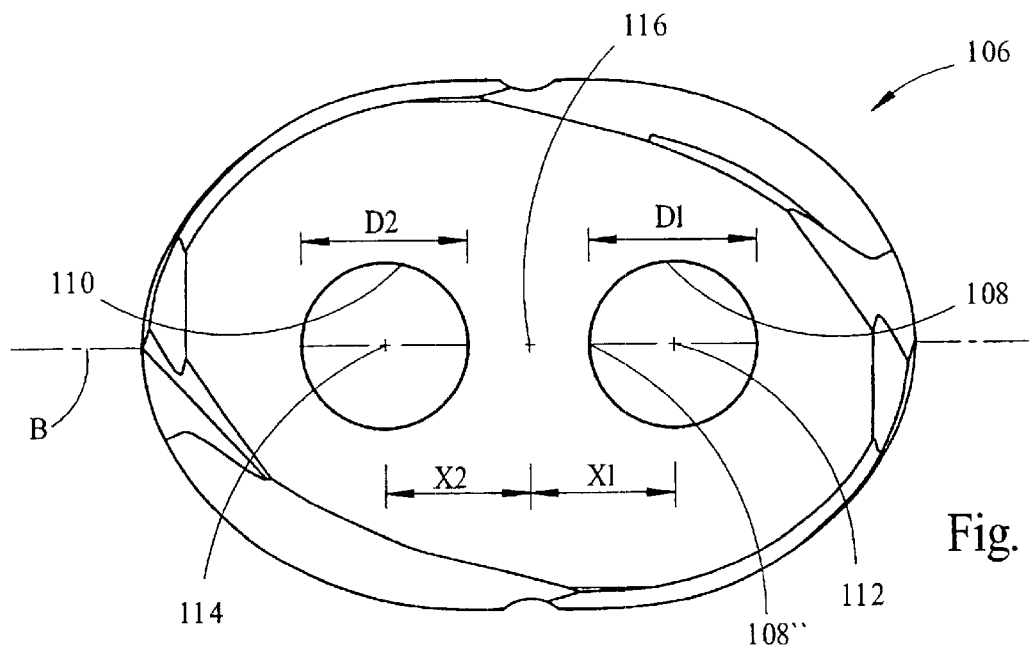
FIG. 10 is a top view of a cutting insert in accordance with the present invention with two non-overlapping circular through bores.

FIGS. 8 to 10 show cutting inserts of different lengths. The length of a cutting insert in accordance with the present invention is measured along the axis of rotation B from one end of the cutting insert to the other. For example, in FIG. 8, the length of the cutting insert 24 is measured along the axis B from its front end 24' to its rear end 24". Typically, in accordance with the present invention, insert lengths can vary from very short, having a length of approximately 0.5W to very long, having a length of approximately 2W. The cutting insert 100 shown in FIG. 9 is relatively short, and is provided with a single through hole, namely a circular bore 102 having a bore axis 104 located substantially at the center of the cutting insert in a top view of the cutting insert. The bore axis 104 is perpendicular to the axis of rotation B of the cutting insert and lies in a vertical longitudinal median plane of the cutting insert. The cutting insert 100 is provided with two axial abutment surfaces 88a, 88b at its front end 100' and two axial abutment surfaces 90a, 90b at it rear end 100" (only one front axial abutment surface 88b and one rear axial abutment surface 90b are seen in FIG. 9. However, the arrangement of the abutment surfaces is the same as that of the abutment surfaces for the medium length cutting insert 24 shown in the perspective view in FIG. 7). The axial abutment surfaces are transverse to the axis of rotation B of the cutting insert. The cutting insert 106 shown in FIG. 10 is relatively long and is provided with two circular bores, a forward circular bore 108 and a rear circular bore 110 having bore axes 112 and 114, respectively. The bore diameter D1, D2 of each of the two circular bores are of substantially equal magnitude D1=D2=D and each bore axis is located at substantially the same distance X1=X2=X from the center of the cutting insert 116 in a top view of the cutting insert. The distance between the two bore axes X+X=2X is greater than a bore diameter D. The bore axes 112, 114 are perpendicular to the axis of rotation B of the cutting insert and lie in a vertical longitudinal median plane of the cutting insert.

The cutting insert 24 shown in FIGS. 7 and 8 is of an intermediate length its length being typically of the order of 1.5W, and is provided with a single through hole 118 formed from two intersecting circular bores, a forward circular bore 120 and a rear circular bore 122 having bore axes 124 and 126, respectively. The bore diameter of the forward circular bore 120 is substantially equal in magnitude to the bore diameter of the rear circular bore 122 and, in a top view of the cutting insert 24, each bore axis is located at substantially the same distance from the center 128 of the cutting insert 24. The distance between the two bore axes is less than a bore diameter and therefore the two bores overlap. The bore axes 124, 126 are perpendicular to the axis of rotation B of the cutting insert and lie in a vertical longitudinal median plane of the cutting insert.

The two dotted lines in FIG. 7 divide the insert upper clamping surface 64 into three regions, two substantially identical outer regions 64' separated by a central region 64". This division into three regions is not a physical division, since all portions of the insert upper clamping surface 64 lie on the same concave surface. However, when the cutting insert is clamped in the cutting insert holder 22 of the embodiment shown in FIGS. 4a, 4b and 5b (as will be described in greater detail below, with respect to FIG. 18), the outer regions 42' of the lower clamping surface 42 of the upper clamping jaw 32 abut the insert upper clamping surface 64 along the outer regions 64' thereof. Hence, the outer regions 64' of the insert upper clamping surface 64 are regions that correspond to the outer regions 42' of the lower clamping surface 42 of the upper clamping jaw 32. Similarly, the insert lower clamping surface 66 is divided into three regions, two substantially identical outer regions 66' separated by a central region 66". The two outer regions 66' correspond to the two outer regions 50' of the upper clamping surface 50 of the lower clamping jaw 34.

It should be noted that the outer regions 64' of the insert upper clamping surface 64 extend to the upper edge 70 thereof. Similarly, the outer regions 66' of the insert lower clamping surface 66 extend to the upper edge 72 thereof. In a similar manner, the clamping surfaces of the cutting inserts 100, 106 shown in FIGS. 9 and 10 are divided into three regions.

Figure 11:
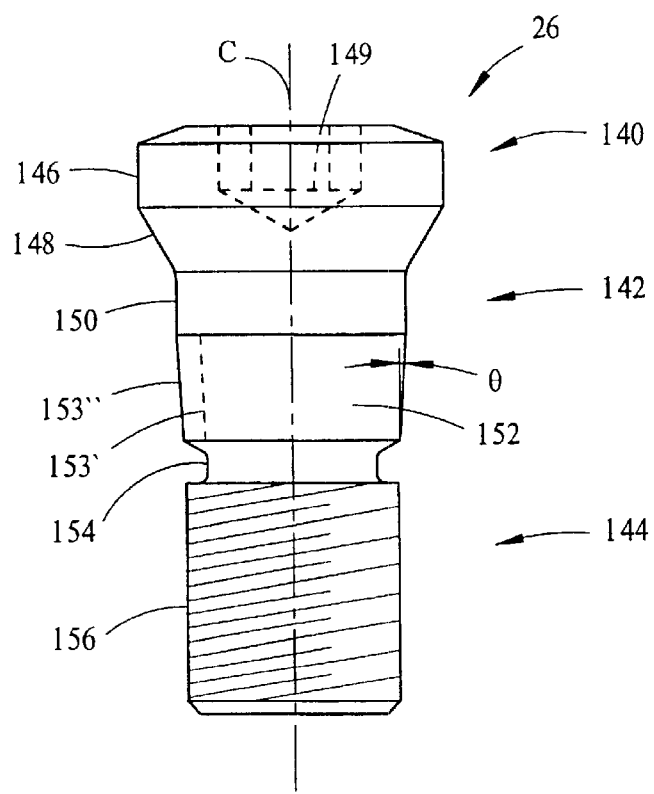
FIG. 11 is a side view of a clamping screw used for clamping a cutting insert in a cutting insert holder in accordance with the present invention.

Attention is now drawn to FIG. 11. The clamping screw 26 of the present invention has a screw axis C and comprises generally three portions; an upper portion 140, a central portion 142 and a lower portion 144. The upper portion 140 comprises an upper cylindrical portion 146 and an upper frusto-conical portion 148. The upper frusto-conical portion 148 tapers downwardly and inwardly from the upper cylindrical portion 146 toward the central portion 142. The clamping screw upper portion 140 is provided with a socket 149 such as a Torx or hexagonal socket, for receiving a wrench for tightening or loosening the clamping screw 26. The clamping screw central portion 142 has a central cylindrical portion 150 connected at its upper end to the upper frusto-conical portion 148 and at its lower end to a central frusto-conical portion 152. The central frusto-conical portion 152 tapers downwardly and inwardly from its upper end, where it is connected to the central cylindrical portion 150, to its lower end where it is connected, via a narrow neck portion 154, to the clamping screw lower portion 144. The clamping screw lower portion 144 comprises a threaded portion 156 of the clamping screw 26. The central frusto-conical portion 152 tapers at an angle θ to the screw axis C. This angle will be referred to herein as the angle of taper of the central frusto-conical portion 152.

Attention is now drawn to FIGS. 12 to 16, illustrating the principle stages involved in clamping the cutting insert in the cutting insert holder 22. For illustrative purposes the cutting insert holder 22 shown in FIGS. 12 to 16 is in accordance with the first embodiment wherein, in an end view of the cutting insert holder 22 the lower clamping surface 42 of the upper clamping jaw 32 and the upper clamping surface 50 of the lower clamping jaw 34 and are both uniformly convex. The cutting insert shown in these figures is a cutting insert 100 with a single circular through bore 102. Furthermore, for simplicity of illustration the case R1=R2=R and r1=r2=r is considered. The gaps between the cutting insert 100 and the cutting insert holder 22, between the camping screw 26 and the cutting insert holder 22, and between the camping screw 26 and the cutting insert 100 are not to scale and have been exaggerated for illustrative purposes.

Figure 12:
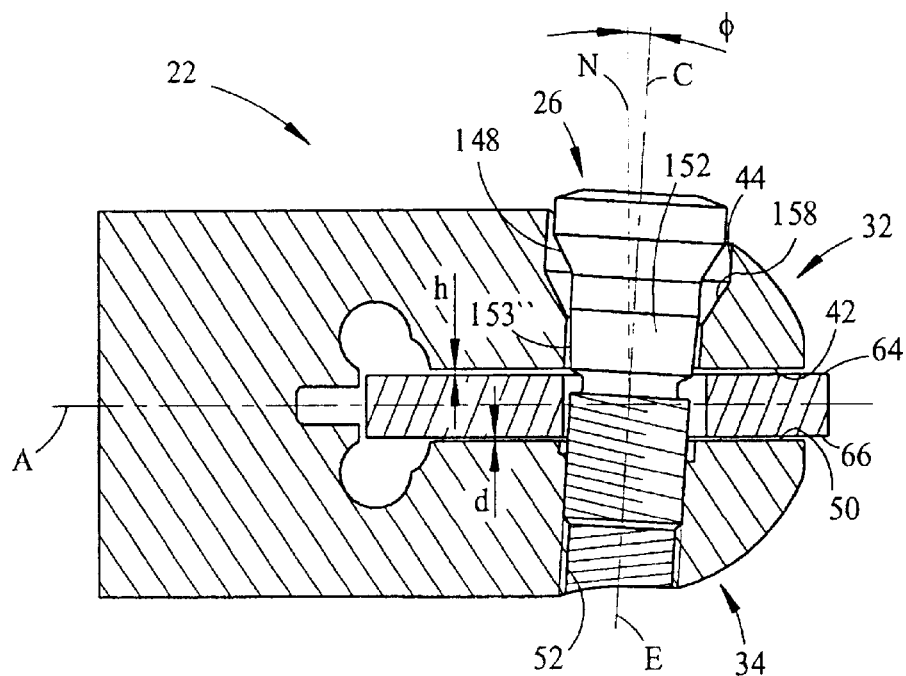
FIG. 12 is a side cross sectional view, in a longitudinal median plane, of the cutting tool assembly of FIG. 1 showing the clamping screw in an initial position before engaging the upper clamping jaw of the cutting insert holder.
Figure 14:
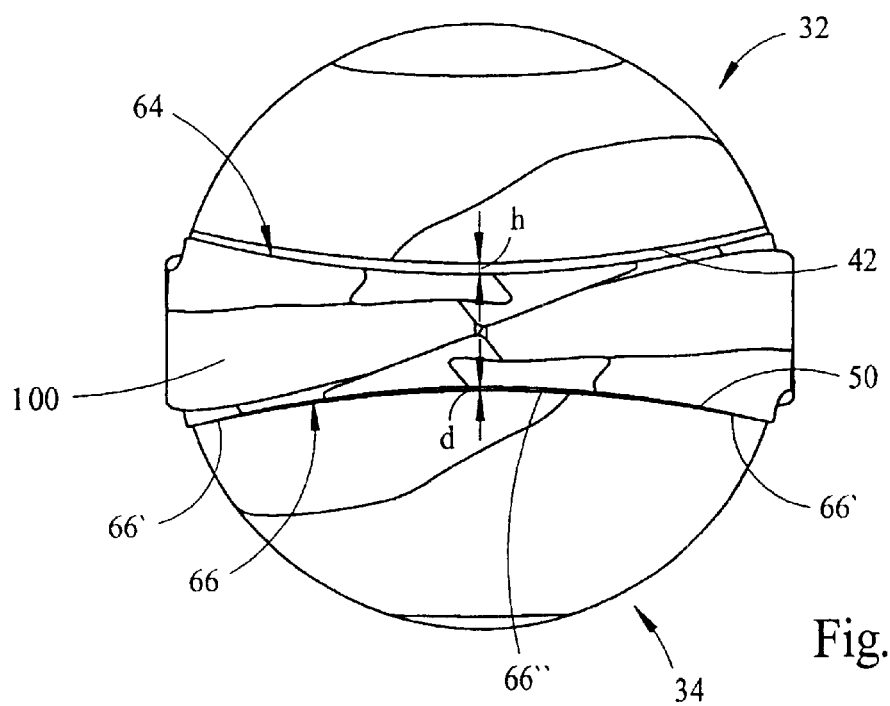
FIG. 14 is a front view of the cutting tool assembly showing the location of the insert clamping surfaces relative to the clamping surfaces of the clamping jaws for both FIGS. 12 and 13.

FIGS. 12 and 14 show the initial arrangement after the cutting insert 100 has been placed in the insert receiving slot 36 and the clamping screw 26 has been positioned in the cutting insert holder 22, so that it passes through the bore 44 in the upper clamping jaw 32, through the through bore 102 in the cutting insert 100 and is received in the threaded bore 52 in the lower clamping jaw 34. In this position, due to the fact that R=r+δ, the insert lower clamping surface 66 rests on the upper clamping surface 50 of the lower clamping jaw 34 with the outer regions 66' of the insert lower clamping surface 66 engaging the upper clamping surface 50 of the lower clamping jaw 34 and with a maximum clearance d between the central region 66" of the insert lower clamping surface 66 and the central region 50" of the upper clamping surface 50 of the lower clamping jaw 34. In accordance with a specific application the clearance d is typically of the order of 0.005 mm to 0.02 mm. There is also a clearance h between the insert upper clamping surface 64 and the lower clamping surface 42 of the upper clamping jaw 32.

The through bore 44 in the upper clamping jaw 32 and the threaded bore 52 in the lower clamping jaw 34 have a common longitudinal bore axis E. The screw axis C coincides with the longitudinal bore axis E and makes an angle φ with a normal N to the axis of rotation A of the cutting insert holder 22. The angle φ is chosen to be equal to the angle of taper θ of the central frusto-conical portion 152. With this choice of the angle φ, the rearmost generator 153", (i.e., rearmost longitudinally directed straight line on the central frusto-conical portion 152) of the central frusto-conical portion 152 is parallel to the normal N to the axis of rotation A.

Figure 13:
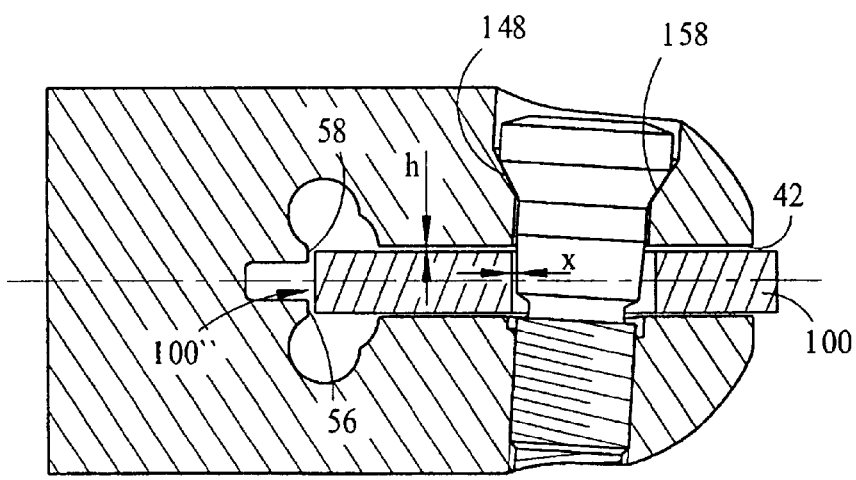
FIG. 13 is a side cross sectional view, in a longitudinal median plane, of the cutting tool assembly of FIG. 1 showing the clamping screw in an initial position engaging the upper clamping jaw of the cutting insert holder but prior to applying force to the clamping jaws.

FIG. 13 shows the situation after the clamping screw 26 has been tightened until the upper frusto-conical portion 148 of the clamping screw 26 engages a corresponding frusto-conical bore 158 that constitutes part of the through bore 44 in the upper clamping jaw 32. It is pointed out that due to the fact that the rearmost generator 153", of the central frusto-conical portion 152 is parallel to the normal N, that as the clamping screw 26 is tightened the rearmost generator of the central frusto-conical portion 152 moves parallel to itself and therefore is always parallel to the normal N to the axis of rotation A. In a non-binding example, for the position shown in FIG. 13, the clearance h between the insert upper clamping surface 64 and the lower clamping surface 42 of the upper clamping jaw 32 is approximately 0.1 mm. There is a clearance x, of approximately 0.035 mm, between the rearmost generator 153" of the central frusto-conical portion 152 and the rear portion 102" of the circular bore 102 of the cutting insert 100.

Figure 15:
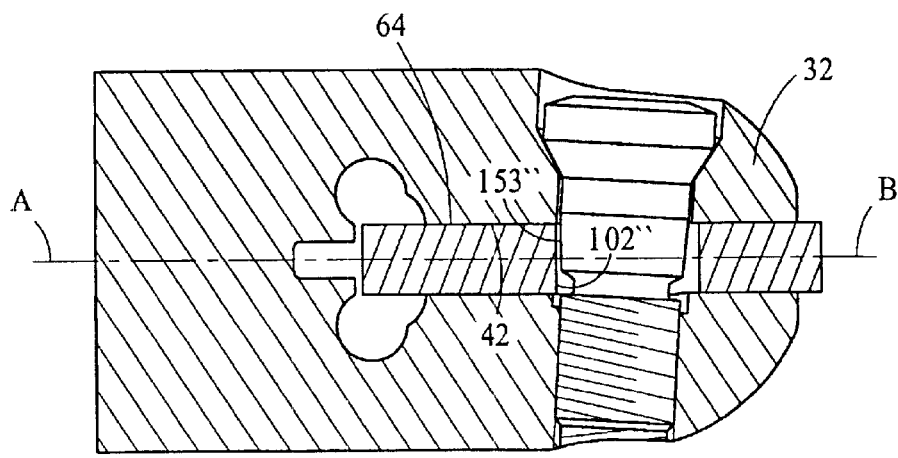
FIG. 15 is a side cross sectional view, in a longitudinal median plane, of the cutting tool assembly of FIG. 1 showing the clamping jaws engaging the insert clamping surfaces but prior to the final tightening of the clamping screw.
Figure 16:
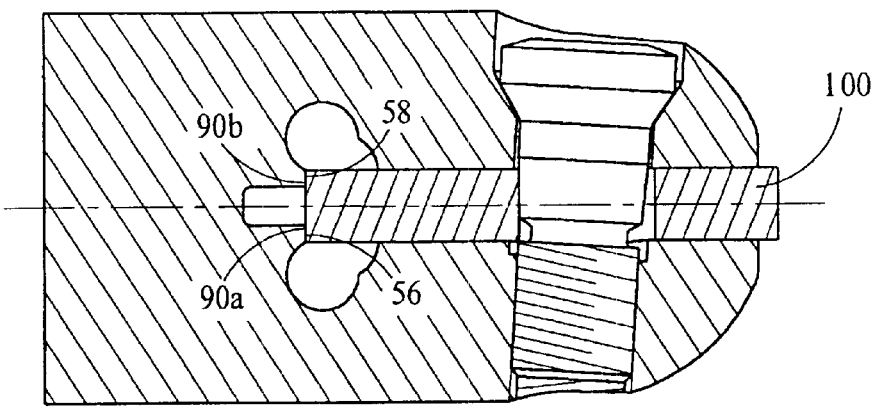
FIG. 16 is a side cross sectional view, in a longitudinal median plane, of the cutting tool assembly of FIG. 1 showing the axial abutment surfaces at the rear of the cutting insert engaging the insert axial location surfaces at the rear of the insert receiving slot, after the final tightening of the clamping screw.
Figure 17:
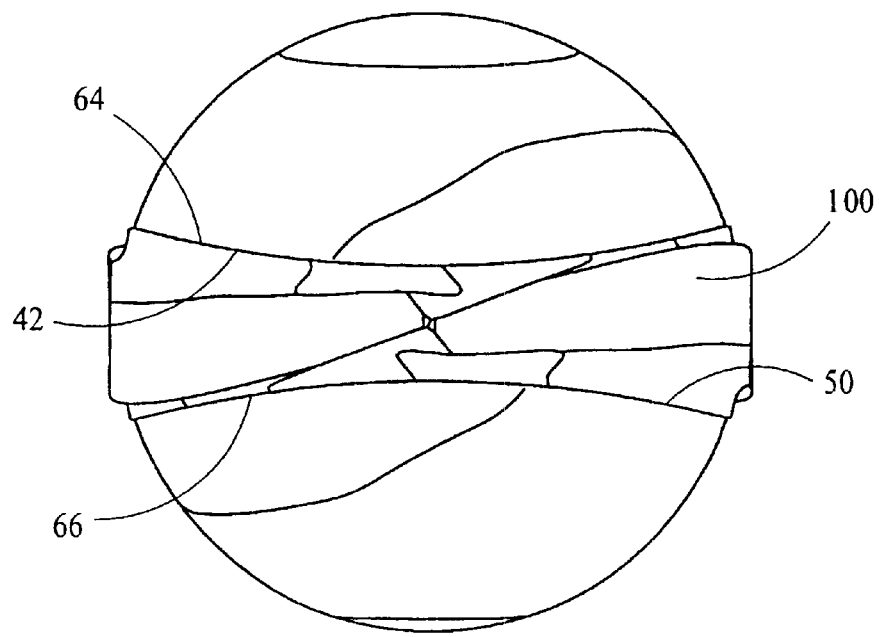
FIG. 17 is a front view of the cutting tool assembly in accordance with FIG. 16.

FIG. 15 shows the situation after further tightening of the clamping screw 26. During the tightening of the clamping screw 26 the clearance h between the insert upper clamping surface 64 and the lower clamping surface 42 of the upper clamping jaw 32 is gradually reduced and a force is exerted by the clamping jaws on the insert clamping surfaces causing the cutting insert 100 to become longitudinally aligned in the cutting insert holder 22 so that the longitudinal axis of rotational symmetry B of the cutting insert becomes aligned with the axis of rotation A of the cutting insert holder 22. In passing from the situation shown in FIG. 13 to that shown in FIG. 15, the clamping screw 26 has moved a vertical distance of approximately 0.1 mm and a corresponding horizontal distance of 0.005 mm, reducing the clearance x between the rearmost generator 153" of the central frusto-conical portion 152 and the rear portion 102" of the circular bore 102 of the cutting insert 100 to approximately 0.03 mm As the clamping screw 26 is further tightened, the rearmost generator 153" of the central frusto-conical portion 152 engages the rear portion 102" of the circular bore 102 of the cutting insert 100 and urges the cutting insert rearwardly until the clearance between the axial abutment surfaces 90a, 90b at the rear 100" of the cutting insert 100 and the insert axial location surfaces 56, 58 at the rear 36" of the insert receiving slot 36 is completely closed and the axial abutment surfaces 90a, 90b engage the insert axial location surfaces 56, 58. As shown in FIGS. 16 and 17, the cutting insert 100 is now firmly clamped, both radially and longitudinally, in the insert receiving slot 36 of the cutting insert holder 22.

For the relatively long cutting insert 106, the procedure for clamping the cutting insert in the cutting insert holder is similar to that described above for the short cutting insert 100. Clearly, the axial dimension of the insert receiving slot 36 will be longer in this case. Furthermore, the cutting insert holder is preferably designed so that the clamping screw 26 is received in the forward circular bore 108 and during the clamping of the cutting insert 106 the clamping screw 26 engages a rear portion 108" of the circular bore 108.

For the cutting insert 24 of intermediate length, the cutting insert holder is preferably designed so that the clamping screw 26 is received in the forward circular bore 120. However, in contrast to the relatively short cutting insert 100 and the relatively long cutting insert 106, in the case of the cutting insert 24 of intermediate length the forward circular bore 120 intersects the rear circular bore 122 and therefore the forward circular bore 120 has no rear portion (see FIG. 8). Hence, during the clamping process, the central frusto-conical portion 152 of the clamping screw 26 engages the forward circular bore 120 at two rear side portions 120", close to the intersection of the forward and rear circular bores 120, 122 and lying on either side of the longitudinal median plane M the axis of rotation B and through the second transverse axis of rotational symmetry T2 of the cutting insert 24. The forward circular bore 120 is engaged by the clamping screw 26 at the two rear side portions of the central frusto-conical portion 152 corresponding to the rear side portions 120" of the forward circular bore 120. Each of the two rear side portions of the central frusto-conical portion 152 is located in a region of a portion of a rear side generator 153' of the central frusto-conical portion 152 of the clamping screw 26. A rear side generator 153' is shown in FIG. 11 by a dashed line. In FIG. 11, only one of the two rear side generators 153' is seen, the other one being on the side of the central frusto-conical portion 152 not seen in the figure, parallel to and "directly behind" the rear side generator 153' that is seen. In order to increase the areas of engagement between the two rear side portions of the central frusto-conical portion of the clamping screw and the two the rear side portions 120" of the forward circular bore 120, the design of the through hole 118 can be suitably altered in the regions of the two the rear side portions 120", as will be apparent to a person skilled in the art.

Figure 18:
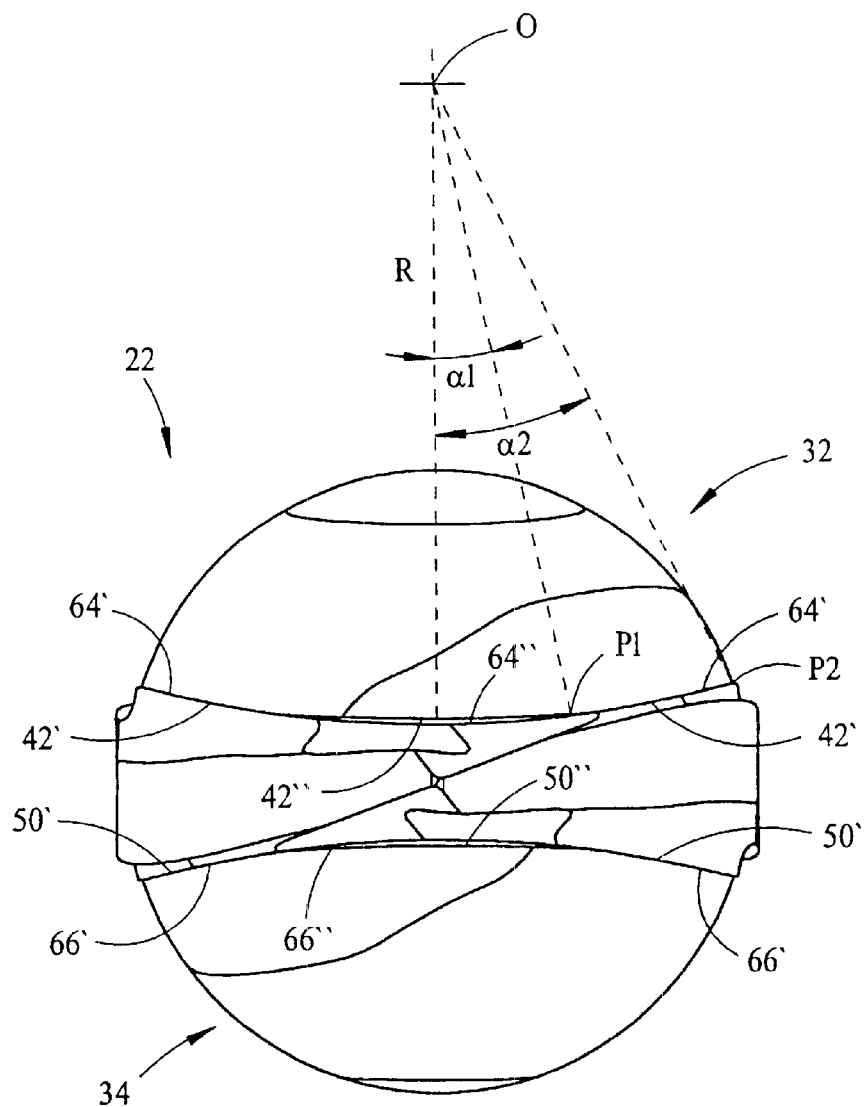
FIG. 18 is a front view of the cutting tool assembly having a cutting insert holder with the clamping surfaces of the clamping jaws divided into three regions, showing the situation after the final tightening of the clamping screw.

FIG. 18 shows the situation after the final tightening of the clamping screw 26, for a cutting tool assembly having a cutting insert holder 22 with the clamping surfaces of the clamping jaws divided into three regions (as shown in FIG. 5b), in accordance with a preferred embodiment of the present invention. As can be seen, the regions of abutment between the upper surface of the cutting insert and the lower clamping surface of the upper clamping jaw 32 is restricted to the outer regions 64' of the clamping surfaces of the cutting insert and the corresponding outer regions 42' of the lower clamping surface of the upper clamping jaw 32. Since the central region 42" of the lower clamping surface 42 has a larger radius of curvature than that of the outer regions 42', a clearance is formed between the central region 42" of the lower clamping surface 42 and the central region 64", of the insert upper clamping surface 64. Therefore, in accordance with the embodiment of the cutting insert holder with the clamping surfaces of the clamping jaws divided into three regions, the central region 42" of the lower clamping surface 42 becomes a clearance surface and does not engage the central region 64" of the insert upper clamping surface 64. Similarly, the regions of abutment between the insert lower clamping surface 66 and the upper clamping surface 50 of the lower clamping jaw 34 are restricted to the outer regions 66' of the insert lower clamping surface 66 and the corresponding outer regions 50' of the upper clamping surface 50 of the lower clamping jaw 34. Therefore, in accordance with the embodiment of the cutting insert bolder with the clamping surfaces of the clamping jaws divided into three regions, the central region 50", of the upper clamping surface 50 becomes a clearance surface and does not engage the central region 66" of the insert lower clamping surface 66. This arrangement assures that the clamping forces applied by the clamping jaws of the cutting insert holder on the clamping surfaces of the cutting insert are applied to the outer (or, side) regions of the clamping surfaces, thereby giving support to the cutting edges extending along the sides of the cutting insert from the front of the cutting insert to the rear of the cutting insert.

It should be noted, that in accordance with the present invention, the insert upper clamping surface 64 engages the lower clamping surface 42 of the upper clamping jaw 32 and the insert lower clamping surface 66 engages the upper clamping surface 50 of the lower clamping jaw 34. Furthermore, in accordance with the preferred embodiment of the present invention, the central region 42" of the lower clamping surface 42 does not engage the central region 64" of the insert upper clamping surface 64 and the central region 50" of the upper clamping surface 50 does not engage the central region 66" of the insert lower clamping surface 66, hence only the outer regions 64', 66' of the cutting insert engage the clamping surfaces 42, 50 of the clamping jaws. This is in complete contrast with the situation in EP 0 417

862 B1, wherein the side portions (numbered 16a, 16b and 16'a, 16'b therein) of the cutting insert described therein do not engage the clamping surfaces of the clamping jaws.

In FIG. 18 two angles α1 and α2 are defined relative to the center of curvature O of the lower clamping surface 42 of the upper clamping jaw 32. The angles α1 and α2 are defined in a plane perpendicular to the axis of rotation A of the cutting insert holder 22. Hence, the dashed lines and the points O, P1 and P2 are all located in the same plane perpendicular to the axis of rotation A. The angle α1 defines the angular location of the innermost point of contact P1 between an outer region 42' of the lower clamping surface 42 of the upper clamping jaw 32 and the insert upper clamping surface 64. The angle α2 defines the angular location of the outermost point of contact P2 between an outer region 42' of the lower clamping surface 42 of the upper clamping jaw 32 and the insert upper clamping surface 64. Since α2 is greater than α1, and since the clamping force on the cutting insert is applied in a direction parallel to the longitudinal vertical median plane M of the cutting insert, which coincides with a longitudinal vertical median plane of the cutting tool assembly when the cutting insert is retained in the cutting insert holder, the condition for sliding contact between the insert upper clamping surface 64 and the lower clamping surface 42 of the upper clamping jaw 32 is that α1 be greater than the angle of friction. In accordance with a specific application the cutting insert holder 22 is made of steel and the cutting insert 24, 100, 106 is made of cemented carbide. In accordance with this specific application α1 should be greater than 10°. Preferably, α2 is approximately 30°.

Although the present invention has been described to a certain degree of particularity, it should be understood that various alterations and modifications can be made without departing from the spirit or scope of the invention as hereinafter claimed. In particular, the invention has been demonstrated with respect to a ball nose end mill having a single replaceable cutting insert retained between the clamping jaws of the ball nose end mill. It will be appreciated that the invention does not relate to a specific type of milling cutter but relates to any milling cutter having a single replaceable cutting insert retained between the clamping jaws of the milling cutter, provided that the clamping surfaces of the clamping jaws are at least partially convex and the insert clamping surfaces are concave and that the radius of curvature of the clamping surfaces of the clamping jaws is larger than the radius of curvature of the insert clamping surfaces.

We claim:

1. A cutting tool assembly comprising a cutting insert holder, a cutting insert and a clamping screw, the cutting insert holder comprising a clamping portion connected to a body portion;

the clamping portion comprising:
    a lower clamping jaw having a lower peripheral surface and an upper clamping surface;
    an upper clamping jaw resiliently connected to the lower clamping jaw, the upper clamping jaw having a lower clamping surface and an upper peripheral surface;
    a through bore passing through the upper and lower clamping jaws, the through bore being threaded in one of the upper or lower clamping jaws;
    an insert receiving slot defined between the upper and lower clamping surfaces;
the cutting insert comprising:
    an insert upper clamping surface bounded by an upper edge;
    an insert lower clamping surface bounded by a lower edge;
    a peripheral side surface between the insert upper clamping surface and the insert lower clamping surface;
    at least one cutting edge associated with the peripheral side surface;
    at least one through hole passing through the cutting insert between the insert upper and lower clamping surfaces;
wherein:
    in a front view of the cutting tool assembly, the upper and lower clamping surfaces of the lower and upper clamping jaws, respectively, are partially convex, and the insert lower and upper clamping surfaces are concave;
    the cutting insert is retained in the insert receiving slot in a retained position by means of the clamping screw which passes through the through bore in the upper and lower clamping jaws of the cutting insert holder and through the at least one through hole in the cutting insert and is screwed into the threaded through bore in one of the upper or lower clamping jaws;
    the lower clamping surface of the upper clamping jaw engages the insert upper clamping surface at at least one upper region of contact and the upper clamping surface of the lower clamping jaw engages the insert lower surface at at least one lower region of contact;
wherein:
    at least a portion of the insert upper clamping surface conforms with a portion of a first cylindrical surface having a first radius of curvature, r1, and a first cylinder axis;
    at least a portion of the insert lower clamping surface conforms with a portion of a second cylindrical surface having a second radius of curvature, r2, and a second cylinder axis;
    the upper clamping surface of the lower clamping jaw partially conforms with a third cylindrical surface having a third radius of curvature, R2, and a third cylinder axis;
    the lower clamping surface of the upper clamping jaw partially conforms with a fourth cylindrical surface having a fourth radius of curvature, R1, and a fourth cylinder axis;
    the fourth radius of curvature, R1, is greater than the first radius of curvature, r1, the third radius of curvature, R2, is greater than the second radius of curvature, r2.

2. The cutting tool assembly according to claim 1, wherein the cutting insert holder has an axis of rotation (A) and the cutting insert has a longitudinal axis of rotational symmetry (B) and a center through which the longitudinal axis of rotational symmetry (B) passes, the longitudinal axis of rotational symmetry (B) constituting an axis of rotation of the cutting insert about which the cutting insert has 180° rotational symmetry.

3. The cutting tool assembly according to claim 2, wherein the first radius of curvature and the second radius of curvature are equal in magnitude, r1–r2, defining a radius of curvature, r, of the cutting insert clamping surfaces, and the third radius of curvature and the fourth radius of curvature are equal in magnitude, R1=R2, defining a radius of curvature, R, of the clamping jaw's clamping surfaces.

4. The cutting tool assembly according to claim 3, wherein the at least one upper region of contact comprises at least two outer regions of the insert upper clamping surface and the at least one lower region of contact comprises at least two outer regions of the insert lower clamping surface.

5. The cutting tool assembly according to claim 4, wherein r =16 mm and R =16.2 mm.

6. The cutting tool assembly according to claim 4, wherein the cutting insert has a width, W, which is greater than a first thickness, T, where the width and first thickness are measured in a front view of the cutting insert as, respectively, the distance between opposing portions of the peripheral side surface, and a maximum distance between the insert upper and lower clamping surfaces.

7. The cutting tool assembly according to claim 6, wherein W/T lies in the range 2.5 to 4.0.

8. The cutting tool assembly according to claim 6, wherein W/T is equal to 3.3.

9. The cutting tool assembly according to claim 6, wherein the width W is greater than a second thickness t that is measured, in a front view of the cutting insert, as a minimum distance between the insert upper and lower clamping surfaces.

10. The cutting tool assembly according to claim 9, wherein W/t lies in the range 4.0 to 6.0.

11. The cutting tool assembly according to claim 9, wherein Wit is equal to 5.3.

12. The cutting tool assembly according to claim 9 wherein the radius of curvature, r, of the cutting insert clamping surfaces is approximately equal to the width W, and the radius of curvature, R, of the clamping jaw's clamping surfaces is approximately equal to the width W.

13. The cutting tool assembly according to claim 2, wherein the insert receiving slot has a forward end for receiving a cutting insert and a rear end at which the upper clamping jaw is resiliently connected to the lower clamping jaw.

14. The cutting tool assembly according to claim 13, wherein the rear end of the insert receiving slot is provided with at least one insert axial location surface transverse to the axis of rotation (A) of the cutting insert holder.

15. The cutting tool assembly according to claim 14, wherein the rear end of the insert receiving slot is provided with at least one generally cylindrical groove transverse to the axis of rotation (A) of the cutting insert holder and adjacent the at least one insert axial location surface.

16. The cutting tool assembly according to claim 2, wherein the cutting insert has two end portions adjacent the axis of rotation (B) of the cutting insert, at least one of the two end portions being provided with axial abutment surfaces transverse to the axis of rotation (B) of the cutting insert.

17. The cutting tool assembly according to claim 16, wherein the axial abutment surfaces are ground.

18. The cutting tool assembly according to claim 2, wherein the at least one through hole in the cutting insert is implemented as a circular bore having a bore axis located substantially at the center of the cutting insert in a top view of the cutting insert, the bore axis being perpendicular to the axis of rotation (B) of the cutting insert.

19. The cutting tool assembly according to claim 2, wherein, the at least one through hole in the cutting insert is implemented as two circular bores, each circular bore having a bore axis and a bore diameter (D1, D2), the bore diameter of each circular bore being substantially equal in magnitude, each bore axis being located at substantially the same distance from the center of the cutting insert in a top view of the cutting insert, each bore axis being perpendicular to the axis of rotation (B) of the cutting insert and the distance between the two bore axes being greater than the bore diameters (D1, D2).

20. The cutting tool assembly according to claim 2, wherein the at least one through hole is implemented by two intersecting circular bores, each circular bore having a bore axis and a bore diameter (D1, D2), the bore diameter of each circular bore being substantially equal in magnitude, each bore axis being located at substantially the same distance from the center of the cutting insert in a top view of the cutting insert, each bore axis being perpendicular to the axis of rotation (B) of the cutting insert and the distance between the two bore axes being less than the bore diameters (D1. D2).

21. The cutting tool assembly according to claim 19, wherein the cutting insert is retained in the insert receiving slot in a retained position by means of a clamping screw which passes through the through bore in the upper and lower clamping jaws of the cutting insert holder and through the circular bore in the cutting insert closest the forward end of the insert receiving slot and is screwed into the threaded through bore in one of the upper or lower clamping jaws.

22. The cutting tool assembly according to claim 20, wherein the cutting insert is retained in the insert receiving slot in a retained position by means of a clamping screw which passes through the through bore in the upper and lower clamping jaws of the cutting insert holder and through the circular bore in the cutting insert closest the forward end of the insert receiving slot and is screwed into the threaded through bore in one of the upper or lower clamping jaws.

23. The cutting tool assembly according to claim 2, wherein, the peripheral side surface of the cutting insert is provided with two diametrically opposite pairs of cutting edges so that when the cutting insert is retained in the insert receiving slot, one pair of cutting edges is located closer to the forward end of the insert receiving slot and constitutes a pair of operative cutting edges and the other pair of cutting edges is located closer to the rear end of the insert receiving slot and constitutes a pair of inoperative cutting edges.

24. The cutting tool assembly according to claim 23, wherein the peripheral side surface is provided with two diametrically opposite notches which are located on a first transverse axis of rotational symmetry (T1) and which separate between the diametrically opposite sets of cutting edges, the first transverse axis of rotational symmetry (T1) passing through the peripheral side surface and perpendicular to the longitudinal axis of rotational symmetry (B), the cutting insert having 180° rotational symmetry about the first transverse axis of rotational symmetry (T1).

25. The cutting tool assembly according to claim 24, wherein each pair of cutting edges comprises one cutting edge which extends from a region close to where the longitudinal axis of rotational symmetry (B) passes through the peripheral side surface upwards towards a notch whilst the other cutting edge extends from the same region close to where the longitudinal axis of rotational symmetry passes through the peripheral side surface downwards towards the diametrically opposite notch.

26. The cutting tool assembly according to claim 25, wherein each cutting edge is provided with a relief surface and a rake surface.

27. A cutting tool assembly according to claim 1, wherein the clamping screw has a screw axis c and comprises:
   an upper portion;
   a central portion; and
   a lower portion;
   the upper portion comprises an upper cylindrical portion and an upper frusto-conical portion, the upper frusto-conical portion tapers downwardly and inwardly from the upper cylindrical portion towards the central portion, the clamping screw upper portion is provided with a socket, for receiving a wrench for tightening or loosening the clamping screw, the clamping screw central portion has a central cylindrical portion connected at its upper end to the upper frusto-conical portion and at its lower end to a central frusto-conical portion, the central frusto-conical portion tapers downwardly and inwardly from the upper end thereof, to the lower end thereof, at the lower end thereof the central frusto-conical portion is connected, via a narrow neck portion, to the clamping screw lower portion, the clamping screw lower portion comprises a threaded portion of the clamping screw, the central frusto-conical portion tapers at an angle q to the screw axis c.

28. A cutting insert having a longitudinal axis of rotational symmetry (B) and a center through which the longitudinal axis of rotational symmetry (B) passes, the longitudinal axis of rotational symmetry (B) constituting an axis of rotation of the cutting insert about which the cutting insert has 180° rotational symmetry, the cutting insert comprising:

an insert upper clamping surface bounded by an upper edge;

an insert lower clamping surface bounded by a lower edge;

a peripheral side surface between the insert upper clamping surface and the insert lower clamping surface;

at least one cutting edge associated with the peripheral side surface;

at least one through hole passing through the cutting insert between the insert upper and lower clamping surfaces;

wherein:

the insert upper clamping surface conforms with a first cylindrical surface having a first radius of curvature, r1, and a first cylinder axis;

the insert lower clamping surface conforms with a second cylindrical surface having a second radius of curvature, r2, and a second cylinder and in a front view of the cutting insert, the insert upper and lower clamping surfaces are concave.

29. The cutting insert according to claim 28, wherein the first radius of curvature and the second radius of curvature are equal in magnitude, r1=r2, defining a radius of curvature, r, of the cutting insert clamping surfaces.

30. The cutting insert according to claim 28, wherein the cutting insert has a width, W, which is greater than a first thickness, T, where the width and first thickness are measured in a front view of the cutting insert as, respectively, the distance between opposing portions of the peripheral side surface, and a maximum distance between the insert upper and lower clamping surfaces.

31. The cutting insert according to claim 30, wherein W/T lies in the range 2.5 to 4.0.

32. The cutting insert according to claim 30, wherein W/T is equal to 3.3.

33. The cutting insert according to claim 30, wherein the width W is greater than a second thickness t that is measured, in a front view of the cutting insert, as a minimum distance between the insert upper and lower clamping surfaces.

34. The cutting insert according to claim 33, wherein W/t lies in the range 4.0 to 6.0.

35. The cutting insert according to claim 33, wherein W/t is equal to 5.

36. The cutting insert according to claim 28, wherein the cutting insert has two end portions adjacent the axis of rotation (B) of the cutting insert, at least one of the two end portions being provided with axial abutment surfaces transverse to the axis of rotation (B) of the cutting insert.

37. The cutting insert according to claim 36, wherein the axial abutment surfaces are ground.

38. The cutting insert according to claim 28, wherein the at least one through hole in the cutting insert is implemented as a circular bore having a bore axis located substantially at the center of the cutting insert in a top view of the cutting insert, the bore axis being perpendicular to the axis of rotation (B) of the cutting insert.

39. The cutting insert according to claim 28, wherein the at least one through hole in the cutting insert is implemented as two circular bores, each circular bore having a bore axis and a bore diameter (D1, D2), the bore diameter of each circular bore being substantially equal in magnitude, each bore axis being located at substantially the same distance from the center of the cutting insert in a top view of the cutting insert, the bore axes being perpendicular to the axis of rotation (B) of the cutting insert and the distance between the two bore axes being greater than the bore diameters (D1. D2).

40. The cutting insert according to claim 28, wherein the at least one through hole is implemented by two intersecting circular bores, each circular bore having a bore axis and a bore diameter (D1, D2), the bore diameter of each circular bore being substantially equal in magnitude, each bore axis being located at substantially the same distance from the center of the cutting insert in a top view of the cutting insert, the bore axes being perpendicular to the axis of rotation (B) of the cutting insert and the distance between the two bore axes being less than the bore diameters (D1, D2).

* * * * *